(12) United States Patent
Lin

(10) Patent No.: US 6,545,966 B1
(45) Date of Patent: Apr. 8, 2003

(54) MECHANISM FOR TRIGGERING AN EJECT DEVICE OF A DISK PLAYER

(75) Inventor: Chi-Cheng Lin, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/377,790

(22) Filed: Aug. 20, 1999

(30) Foreign Application Priority Data

Feb. 12, 1999 (TW) ........................................ 88102207 A

(51) Int. Cl.⁷ .............................................. G11B 33/02
(52) U.S. Cl. ...................................................... 369/75.1
(58) Field of Search .............................. 369/75.1, 75.2, 369/77.1

(56) References Cited

U.S. PATENT DOCUMENTS

| | | | | |
|---|---|---|---|---|
| 4,851,938 A | * | 7/1989 | Inami ......................... | 360/96.5 |
| 5,134,603 A | | 7/1992 | Baas .......................... | 369/75.2 |
| 5,517,478 A | | 5/1996 | Park .......................... | 369/77.2 |
| 6,243,347 B1 | * | 6/2001 | Kawana et al. ............ | 369/77.1 |

FOREIGN PATENT DOCUMENTS

| JP | 60-123578 | | 7/1985 |
|---|---|---|---|
| JP | 61-134958 | | 6/1986 |
| JP | 1-32455 | * | 2/1989 |
| JP | 9-63162 | * | 3/1997 |

* cited by examiner

*Primary Examiner*—David Davis

(57) ABSTRACT

A trigger mechanism is provided for triggering an eject device of an electronic equipment with a front panel door. The eject device ejects a tray device, movably seated within the space of the electronic equipment, out of the electronic equipment when triggered. The trigger mechanism cooperates with the front panel door to trigger the eject device. The trigger mechanism works to trigger the eject device when a predetermined displacement of the front panel door form a normally closed position takes place. According to the invention, user can eject the tray device of the electronic equipment only by pressing the front panel door of the electronic equipment such that mistaken pressing of another functional button set on the front panel of the electronic equipment and possible cut of user's hand can be prevented. The trigger mechanism is composed of several simply mechanical components replacing a conventional trigger mechanism via a button such that manufacture cost of the electronic equipment can be reduced.

4 Claims, 6 Drawing Sheets electrically connected
to eject device

MECHANISM FOR TRIGGERING AN EJECT DEVICE OF A DISK PLAYER

FIELD OF INVENTION

The invention relates to a trigger mechanism cooperating with a front panel door of an electronic equipment for triggering an eject device of the electronic equipment to eject a tray device, which movably seats within the electronic equipment, out of the electronic equipment. The electronic equipment is a popular disk player, e.g., a compact disk player, a CD ROM player, a CD R/W ROM player, a laser disk player, a VCD player or a DVD player.

BACKGROUND OF INVENTION

As shown in FIG. 1, a popular electronic equipment 10, such as a compact disk player, a CD ROM player, a CD R/W ROM player, a laser disk player, a VCD player or a DVD player, in general, has an input device of tray device 11 for accommodating the disk in which a huge amount of information is stored. The tray device 11 movably seats within the space of the electronic equipment 10. Typically, the electronic equipment 10 is equipped with an eject device (not shown) such as an electrically driven step motor for ejecting the tray device 11 out of the electronic equipment 10.

Also shown in FIG. 1, the electronic equipment 10, in general, has a front panel 101 and a front panel door 102. The front panel door 102 of the electronic equipment 10 is engaged with the front panel 101 of the electronic equipment 10 to pivotally close and open. The electrically driven eject device of the electronic equipment 10, in general, is triggered by pressing an eject button 103 set on the front panel 101. However, this usually causes mistaken pressing of another functional button and possible cut of user's hand by sharp edges of the tray device 11. This also causes inconvenience for an electronic equipment with a tray device displaced erectly.

Accordingly, to solve the problems mentioned above, this present invention provides a trigger mechanism of an eject device of an electronic equipment replacing the convention trigger mechanism via a button. In particular, the trigger mechanism of the invention cooperates with the front panel door of the electronic equipment, and is composed of several simply mechanical components. When using an electronic equipment according to the invention, user can eject the tray device of the electronic equipment only by pressing the front panel door of the electronic equipment such that mistaken pressing of another functional button set on the front panel of the electronic equipment and possible cut of user's hand can be prevented. By the simply mechanical mechanism replacing the conventional button for triggering the eject device of the electronic equipment, manufacture cost of the electronic equipment can be reduced. Obviously, the trigger mechanism of the invention also provides convenience for an electronic equipment with a tray device placed erectly.

U.S. Pat. No. 5,517,478 is to provide a disk player with capability of loading and ejecting a disc into and out of the disk player in response to the closing and opening operations of a lid. However, since the disk player of the prior art utilizes a mechanical eject device rather than an electrically driven eject device, it is obvious that the triggering of the eject device of the disk player according the prior art is not adapted for a disk player with an electrically driven eject device.

U.S. Pat. No. 5,134,603 is to provide a disk player for inserting and extracting a disk. The disk player includes a movable member and a stationary housing member. The movable member is capable of moving into and out of the stationary housing member in a direction. The movable member is provided with two nose-shaped elements that are spaced from one another. A single switch mounted on the stationary housing member is actuated by the nose-shaped elements when the movable member moves in-and-out of the stationary housing member. The in-and-out movement of the movable member is made dependent on the states of the single switch. However, in the prior art, the practical operation for triggering the out-of movement of the movable member is to pull out the stationary housing member to a predetermined position by hand. Therefore, the disk player possibly cut of user's hand when operated.

SUMMARY OF INVENTION

An objective of the invention is to provide a trigger mechanism for triggering an eject device of an electronic equipment. When triggered, the eject device ejects a tray device, which movably seats within the electronic equipment, out of the electronic equipment. The electronic equipment is a popular electronic equipment such as a compact disk player, a CD ROM player, a CD R/W ROM player, a laser disk player, a VCD player or a DVD player.

According to the invention, the trigger mechanism cooperates with the front panel door of the electronic equipment. The trigger mechanism works to trigger the eject device when a predetermined displacement of the front panel door of the electronic equipment form a normally closed position takes place. The trigger mechanism of the invention can prevent from mistaken pressing of another functional button set on the front panel and possible cut of user's hand when user triggers the eject device by hand. The trigger mechanism of the invention also provides convenience for an electronic equipment with a tray device displaced erectly.

According to the invention, the trigger mechanism is composed of several simply mechanical components replacing the conventional trigger mechanism via a button. Therefore, the trigger mechanism of the invention can reduce manufacture cost of the electronic equipment.

The advantage and spirit of the invention may be understood by the following recitations together with the appended drawings.

BRIEF DESCRIPTION OF THE APPENDED DRAWINGS

FIG. 1A and FIG. 1B show a general triggering mechanism for triggering an eject device of an electronic equipment by a button set on the front panel of the electronic equipment to eject a tray device of the electronic equipment out of the electronic equipment.

FIG. 2A discloses the essentials and location of the trigger mechanism in accordance with a first embodiment of the invention.

FIG. 2B is a sectional view showing how the trigger mechanism of FIG. 2A cooperates with the front panel door of the electronic equipment.

FIG. 3A discloses the essentials and location of the trigger mechanism in accordance with a second embodiment of the invention.

FIG. 3B is a sectional view showing how the trigger mechanism of FIG. 3A cooperates with the front panel door of the electronic equipment.

FIG. 4A discloses the essentials and location of the trigger mechanism in accordance with a third embodiment of the invention.

FIG. 4B is a sectional view showing how the trigger mechanism of FIG. 4A cooperates with the front panel door of the electronic equipment.

FIG. 5A discloses the essentials and location of the trigger mechanism in accordance with a forth embodiment of the invention.

DETAILED DESCRIPTION OF THE INVENTION

The invention provides a trigger mechanism for triggering an eject device of a popular electronic equipment, e.g., a CD ROM player, a CD R/W ROM player, a laser disk player, a VCD player or a DVD player. When triggered, the eject device ejects a tray device, which movably seats within the electronic equipment, out of the electronic equipment. In particular, the trigger mechanism is composed of several simply mechanical components replacing the convention trigger mechanism via a button, and cooperates with a front panel door of the electronic equipment. In practical application, user presses the front panel door by hand to trigger the eject device. Therefore, the trigger mechanism of the invention can prevent from mistaken pressing of another functional button set on the front panel and possible cut of user's hand by the quick ejected tray device. Moreover, the trigger mechanism of the invention can reduce manufacture cost of the electronic equipment. The trigger mechanism of the invention also provides convenience for an electronic equipment with a tray device displaced erectly. Several preferred embodiments of the invention are disclosed as follows.

Figure 1A:
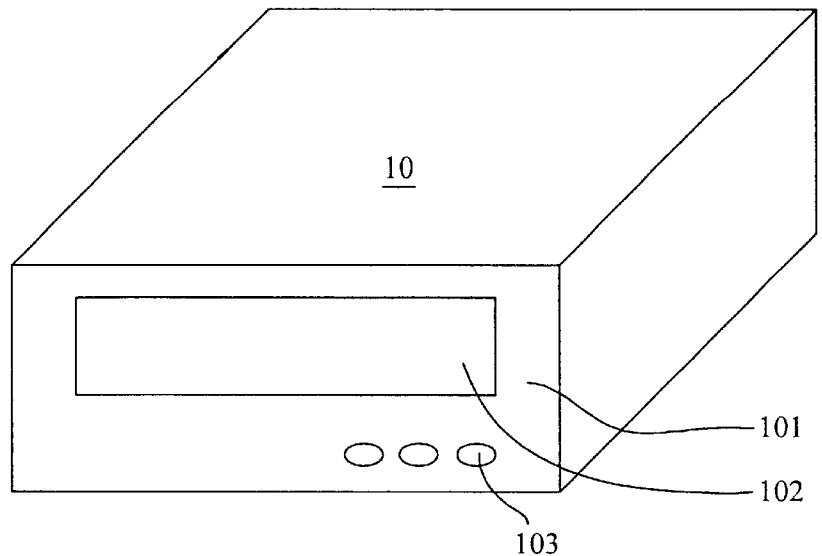
Figure 1B:
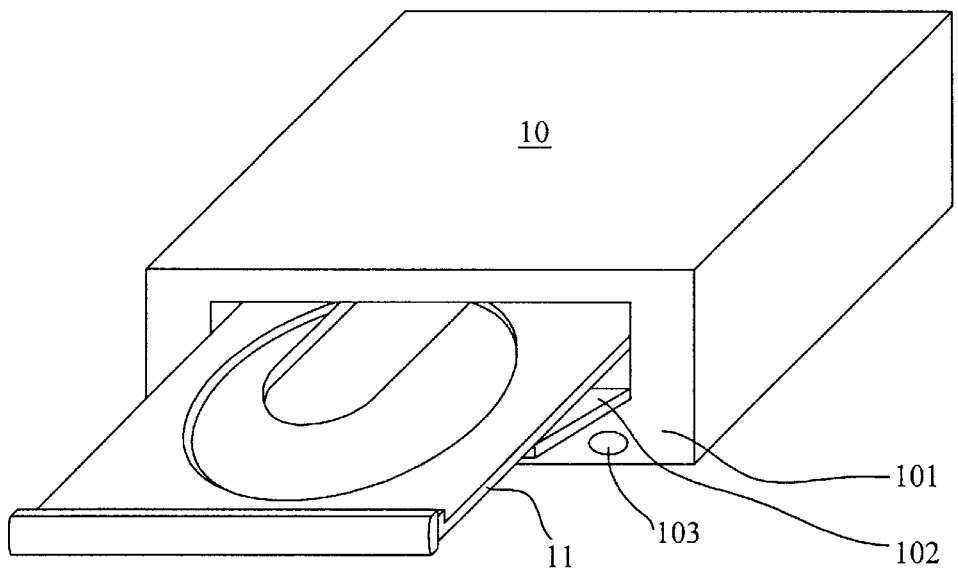
Figure 2A:
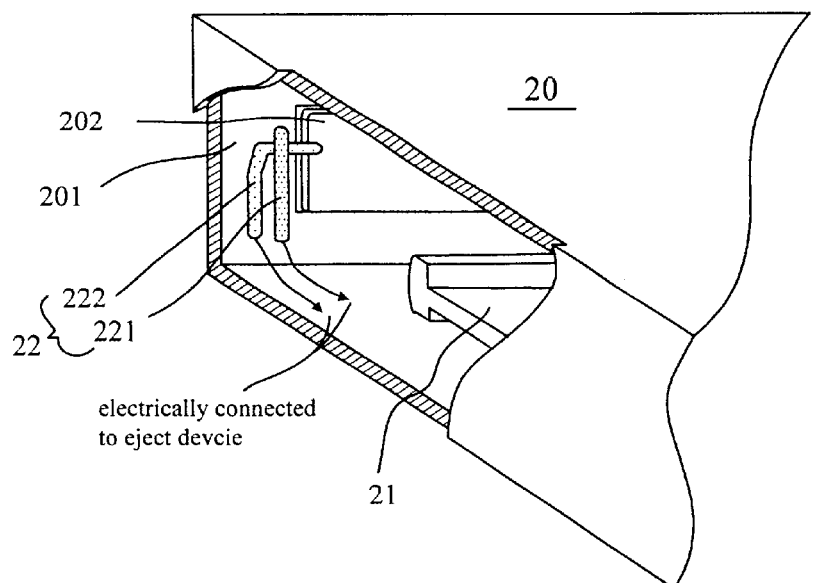

Referring to FIG. 2, a first embodiment of the invention is described illustratively. As shown in FIG. 2A, the essentials and location of the trigger mechanism 22 in accordance with the first embodiment of the invention is disclosed. The trigger mechanism 22 is provided for triggering an eject device (not shown), such as a electrically driven step motor, of an electronic equipment 20 with a front panel 201 and front panel door 202. The eject device ejects a tray device 21, which movably seats within the electronic equipment 20, out of the electronic equipment 20 when triggered. The front panel door 202 of the electronic equipment 20 is engaged with the front panel 201 of the electronic equipment 20 to pivotally close and open. As shown in FIG. 2A, the trigger mechanism 22 includes a first component 221 and a second component 222 electrically connected to the eject device, respectively. The second component 222 is actuated to contact the first component 221 in response to a minor tilt displacement of the front panel door 202 from a vertical position, i.e., a normally closed position. The eject device is electrically contacted and triggered when the second component 222 contacts the first component 221.

Figure 2B:
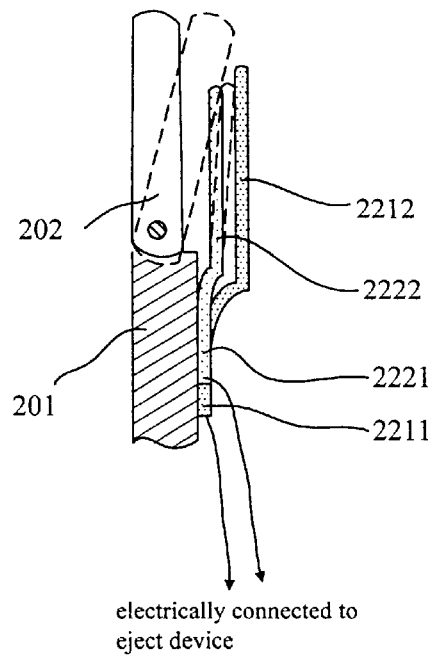

In the first embodiment of the invention, the cooperation between the front panel door 202 and the trigger mechanism 22 may be understood by FIG. 2B. As shown in FIG. 2B, the first component 221 is an I-shaped component and mainly includes a first part 2211 set on the rear side of the front panel 201 and a second part 2212 away form the rear side of the front panel 201. The second component 222 is an inverted-L-shaped component and mainly includes a first part 2221 set on the rear side of the front panel 201 and a second part 2222 away from the rear side of the front panel 201 and extending through between the second part 2212 of the first component 221 and the front panel 201 and to the rear side of the front panel door 202. When the minor tilt displacement of the front panel door 202 from the vertical position takes place, the second part 2222 of the second component 222 is actuated to contact the second part 2212 of the first component 221 to trigger the eject device. In a preferred embodiment, the first component 221 and the second component 222 of the trigger mechanism 22 are a piece-shaped component, respectively. The first component 221 and the second component 222 are formed by a conductive material such as a metal material or a conductive plastic.

Figure 3A:
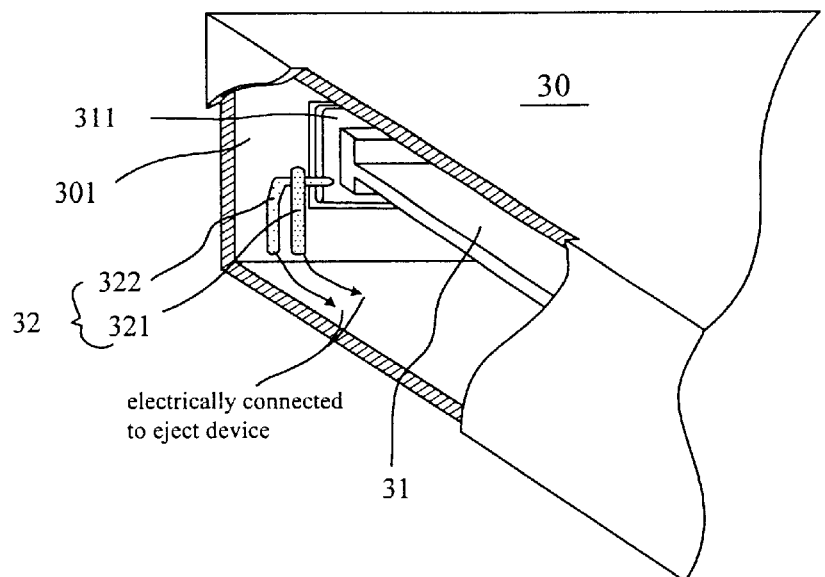

Referring to FIG. 3, a second embodiment of the invention is described illustratively. As shown in FIG. 3A, the essentials and location of the trigger mechanism 32 in accordance with the second embodiment of the invention is disclosed. The trigger mechanism 32 is provided for triggering an eject device (not shown) of an electronic equipment 30 with a front panel 301. The eject device ejects a tray device 31, which movably seats within the electronic equipment 30, out of the electronic equipment 30 when triggered. In particular, a front panel door 311 is attached to the tray device 31 such that the front panel door 311 is together with the tray device 31 to move. This design is widely employed in a disk player. As shown in FIG. 3A, the trigger mechanism 32 includes a first component 321 and a second component 322 electrically connected to the eject device, respectively. The second component 322 is actuated to contact the first component 321 in response to a minor horizontal displacement of the front panel door 311 from a normally closed position. The eject device is electrically contacted and triggered when the second component 322 contacts the first component 321.

Figure 3B:
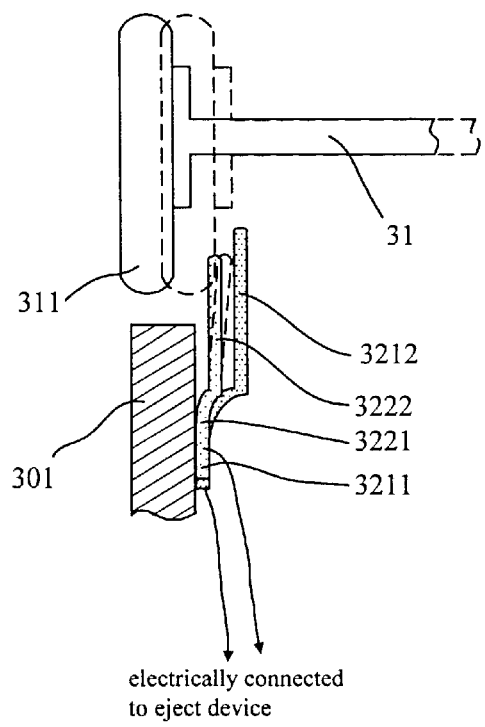

In the second embodiment of the invention, the cooperation between the font panel door 311 and the trigger mechanism may be understood by FIG. 3B. As shown in FIG. 3B, the first component 321 is an I-shaped component and mainly includes a first part 3211 set on the rear side of the front panel 301 and a second part 3212 away form the rear side of the front panel 301. The second component 322 is an inverted-L-shaped and mainly includes a first part 3221 set on the rear side of the front panel 301 and a second part 3222 away from the rear side of the front panel 301 and extending through between the second part 3212 of the first component 321 and the front panel 301 and to the rear side of the front panel door 311. When the minor horizontal displacement of the front panel door 311 from the normally closed position takes place, the second part 3222 of the second component 322 is actuated to contact the second part 3212 of the first component 321 to trigger the eject device. In a preferred embodiment, the first component 321 and the second component 322 of the trigger mechanism 32 are a piece-shaped component, respectively. The first component 321 and the second component 322 are formed by a conductive material such as a metal material or a conductive plastic.

Figure 4A:
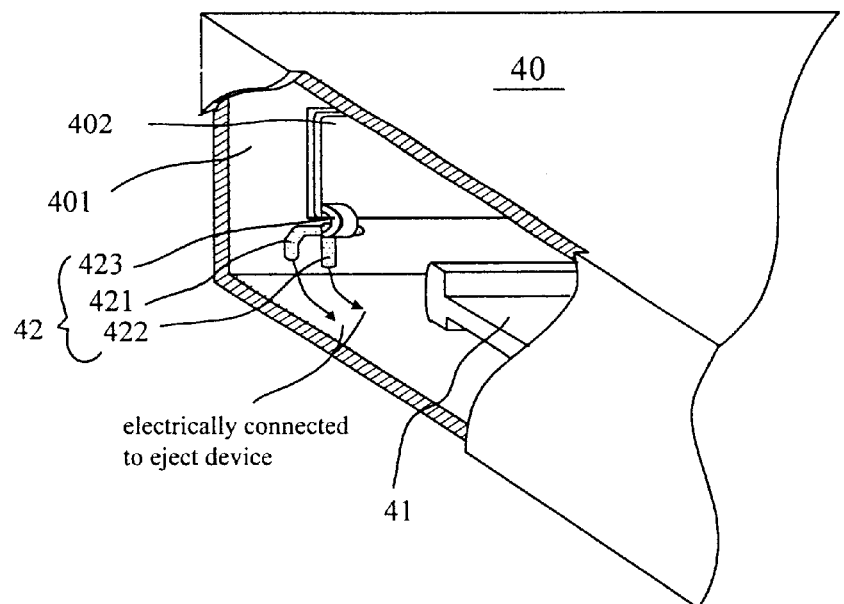

Referring to FIG. 4, a third embodiment of the invention is described illustratively. As shown in FIG. 4A, the essentials and location of the trigger mechanism 42 in accordance with the third embodiment of the invention is disclosed. The trigger mechanism 42 is provided for triggering an eject device (not shown) of an electronic equipment 40 with a front panel 401 and front panel door 402. The eject device ejects a tray device 41, which movably seats within the electronic equipment 40, out of the electronic equipment 40 when triggered. The front panel door 402 of the electronic equipment 40 is engaged with the front panel 401 of the electronic equipment 40 to pivotally close and open. As shown in FIG. 4A, the trigger mechanism 42 includes a first component 421 and a second component 422 electrically connected to the eject device, respectively. The trigger mechanism 42 also includes a third component 423 attached to the front panel door 402 of the electronic equipment 40. When the front panel door 402 is pressed to take place a minor tilt displacement of from a vertical position, i.e., a normally closed position, the second component 422 is actuated to contact the first component 421. Thereby, the eject device is electrically contacted and triggered. The third component 423 extends from the rear side of the front panel door 402 such that the third component 423 is together with the front panel door 402 to rotate in the same rotary direction. The third component 423 actuates the second component 422 to contact the first component 421 when the minor tilt displacement of the front panel door 402 form the vertical position takes place.

Figure 4B:
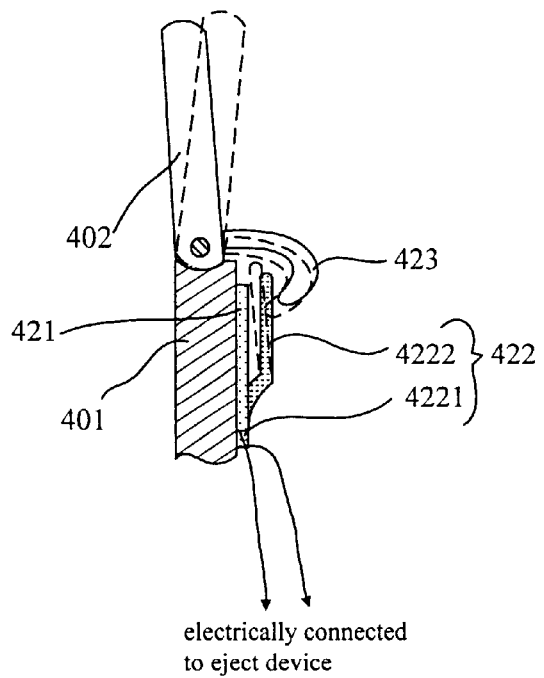

In the third embodiment of the invention, the cooperation between the font panel door 402 and the trigger mechanism 42 may be understood by FIG. 4B. As shown in FIG. 4B, the first component 421 is an inverted-L-shaped component and set on the rear side of the front panel 401. The second component 422 is an I-shaped component, and mainly includes a first part 4221 set on the rear side of the front panel 401 and a second part 4222 away from the rear side of the front panel 401 and extending between the first component 421 and the third component 423. When the minor tilt displacement of the front panel door 402 from the vertical position takes place, the second part 4222 of the second component 422 is actuated by the third component 423 to contact the first component 421 to trigger the eject device. In a preferred embodiment, the first component 421 and the second component 422 of the trigger mechanism 42 are a piece-shaped component, respectively. The first component 421 and the second component 422 are formed by a conductive material such as a metal material or a conductive plastic. The third component 423 of the trigger mechanism 42 is a curve-shaped arm component.

Referring to FIG. 5, a forth embodiment of the invention is described illustratively. As shown in FIG. 5A, the essentials and location of the trigger mechanism 52 in accordance with the forth embodiment of the invention is disclosed. The trigger mechanism 52 is provided for triggering an eject device (not shown) of an electronic equipment 50 with a front panel 501 and front panel door 502. When triggered, the eject device ejects a tray device 51, which movably seats within the electronic equipment 50, out of the electronic equipment 50. The front panel door 502 of the electronic equipment 50 is engaged with the front panel of the electronic equipment 50 to pivotally close and open. As shown in FIG. 5A, the trigger mechanism 52 includes a first component 521, a second component 522, and a switch device 523 for selectively triggering the eject device. The second component 522 extends from the rear side of the front panel door 502 such that the second component 522 is together with the front panel door 502 to rotate in the same rotary direction. The second component 522 rotates and actuates the first component 521 to switch on the switch device 523 in response to a minor tilt displacement of the front panel door 502 form the vertical position. In preferred embodiment, the first component 521 includes a bent arm element 5211 and a support 5212 with a hinge pin, and the second component 522 is a curve-shaped arm component, as shown in FIG. 5B. The support 5212 is fixed on the rear side of the front panel 501 of the electronic equipment 50. The bent arm element 5211 is pivotally connected to the hinge pin of the support 5212 such that the bent arm element 5211 is allowed to rotate in a predetermined range.

Figure 5A:
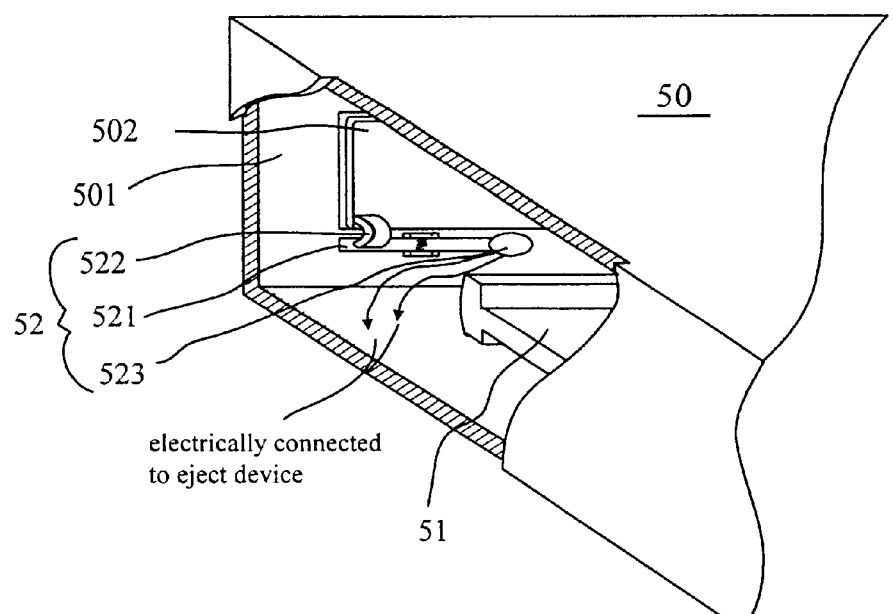
FIG. 5B is an explosive view of the first component disclosed in FIG. 5A.
FIG. 5C and FIG. 5D are respectively a sectional view showing how the trigger mechanism of FIG. 5A cooperates with the front panel door of the electronic equipment.
Figure 5B:
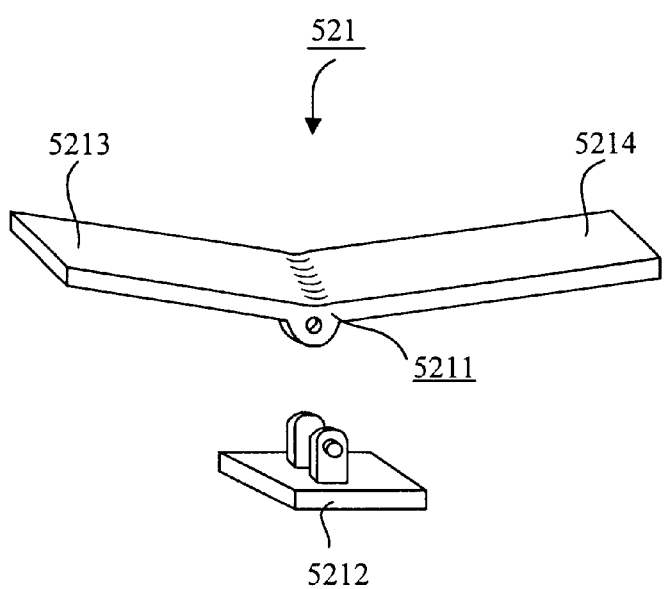
Figure 5C:
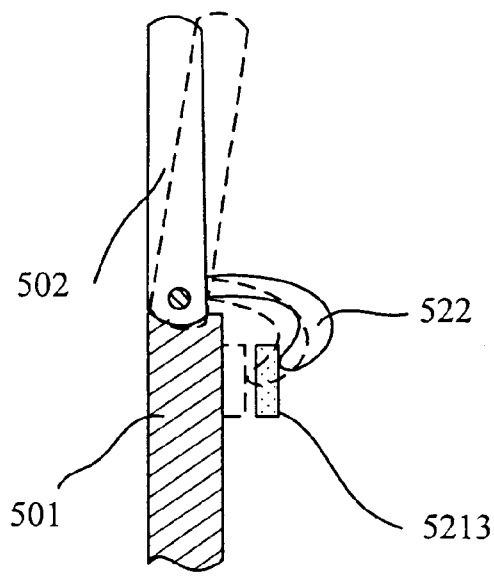
Figure 5D:
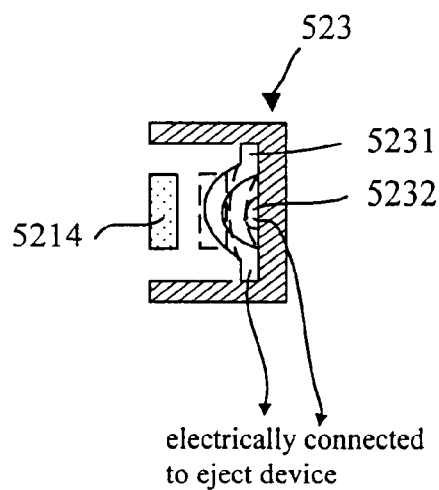

In the forth embodiment of the invention, the cooperation between the font panel door 502 and the trigger mechanism 52 may be understood by FIG. 5C and FIG. 5D. The first component 521 is set on the rear side of the front panel 501. When the minor tilt displacement of the front panel door 502 takes place, the second component 522 actuates a first end 5213 of the bent arm element 5211 to move in a first direction (the direction toward the rear side of the front panel 501), as shown in FIG. 5C. In the same time, a second end 5214 of the bent arm element 5211 is actuated to move in a second direction (the direction away from the rear side of the front panel 501), opposite to the first direction, to switch on the switch device 523, as shown in FIG. 5D. In a preferred embodiment, the switch device 523 is a simple switch, for instance, composed of a conductive film 5231 and a point 5232 electrically connected to the eject device, respectively, as shown in FIG. 5D. When the conductive film 5231 contacts the point 5232, the eject device is triggered.

The above details of the preferred embodiments of the invention aforesaid are illustrative rather than limiting. For instance, the components consisting of the trigger mechanism according to the invention may be replaced equivalently by other forms which are obvious to persons skillful in the arts. Accordingly, any equivalent modifications, substitutes, alterations or changes to the preferred embodiment without departing form the spirit of the invention are likely to persons ordinary skills in the arts, and are still within the intended scope of the protection of the invention which is defined by the following claims and their equivalences.

What is claimed is:

1. A mechanism for triggering an eject device of an electronic equipment, the eject device ejecting a tray device movably seated within the electronic equipment out of the electronic equipment when triggered, wherein the electronic equipment has a front panel defining a rear side and a front panel door defining a rear side, the mechanism comprising:
   a first means electrically connected to the eject device, comprising:
      a first part set on the rear side of the front panel; and
      a second part away from the rear side of the front panel;
   a second means electrically connected to the eject device, comprising:
      a first part set on the rear side of the front panel; and
      a second part extending through between the second part of the first means and the front panel and to the rear side of the front panel door;
   wherein, the second part of the second means is actuated to contact the second part of the first means to trigger the eject device when a displacement of the front panel door takes place.

2. The mechanism of claim 1, wherein the eject device is an electrically driven eject device.

3. The mechanism of claim 2, wherein the first means and the second means are respectively formed by a conductive material.

4. The mechanism of claim 3, wherein the first means and the second means are a piece-shaped component respectively.

* * * * *